United States Patent Office 2,751,381
Patented June 19, 1956

2,751,381

PROCESS OF PRODUCING EPOXY STEROID COMPOUNDS

George Slomp, Jr., Kalamazoo Township, Kalamazoo County, Mich., assignor to The Upjohn Company, Kalamazoo, Mich., a corporation of Michigan No Drawing. Application January 4, 1954,
Serial No. 402,128

6 Claims. (Cl. 260—239.55)

The present invention relates to diepoxy steroid compounds of the pregnane series, and is more particularly concerned with novel 3-hydroxy-5(6),16(17)-diepoxypregnan-20-one, the 3-esters thereof and a novel process for the production thereof.

The novel compounds of the present invention may be represented by the formula:

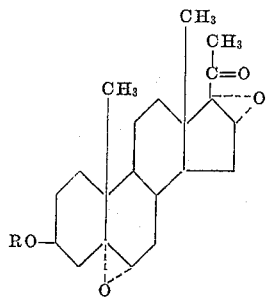

wherein R is selected from the group consisting of hydrogen and acyl radicals of hydrocarbon carboxylic acids containing up to and including eight carbon atoms.

The process of the present invention consists of treating a 3,20-diacyloxy-5,16,20-pregnatriene with an organic peracid, to obtain selective epoxidation of the 5(6) and the 16(17) double bonds, and hydrolyzing the thus-obtained 3,20-diacyloxy-5α(6α),16α(17α)-dioxido-20-pregnene to obtain 3-hydroxy-5α(6α),16α(17α)-diepoxypregnan-20-one. Esterification of this compound yields 3-acyloxy-5α(6α), 16α(17α)-diepoxypregnan-20-one.

It is an object of the present invention to provide 3-hydroxy-5(6),16(17)-diepoxypregnan-20-ones and esters thereof. Another object of the present invention is the process for the production of 3-hydroxy-5α(6α),16α-(17α)-diepoxypregnan-20-one and esters thereof, which involves a selective epoxidation of a 3,20-diacyloxy-5,16,-20-pregnatriene and subsequent hydrolysis of an ester and an enol ester group to yield 3-hydroxy-5α(6α),16α-(17α)-diepoxypregnan-20-one. Other objects of the present invention will be apparent to those skilled in the art to which this invention pertains.

The diepoxides of this invention are valuable intermediates in the preparation of physiologically active steroid compounds. For example, Reichstein's Compound S and Kendall's Compound F acetate may be obtained from 3β-hydroxy-5(6),16(17)-dioxidopregnan-20-one or a 3β-ester thereof by bromination to give 3β-hydroxy-5(6),16(17)-diepoxy-21-bromopregnan-20-one or the 3β-ester thereof, treatment with sodium iodide in acetone and treatment of the thus-formed 21-iodide with potassium acetate to yield 3β-hydroxy-5(6),16(17)-diepoxy-21-acetoxypregnan-20-one or the 3β-ester thereof, treatment with hydrogen bromide followed by Raney nickel reduction to give 3β,5α,17α-trihydroxy-21-acetoxypregnan-20-one or 3β-acyloxy-5α,17α-trihydroxy-21-acetoxypregnan-20-one. Oxidation of 3β,5α,17α-trihydroxy-21-acetoxypregnan-20-one or selective hydrolysis of the ester thereof followed by oxidation with chromic acid gives 5,17α-dihydroxy-21-acetoxypregnane-3,20-dione which when boiled with alcoholic potassium carbonate yields 17α-hydroxy-21-acetoxy-4-pregnene-3,20-dione (Compound S acetate). Treatment of Reichstein's Compound S acetate with *Streptomyces fradiae* [cf. Colingsworth et al., J. Am. Chem. Soc. 74, 2381 (1952)] yields Kendall's Compound F (11β,17α-dihydroxy-21-acetoxy-4-pregnene-3,20-dione).

The starting compounds of the present invention are the 3β,20-diacyloxy-5,16,20-pregnatrienes. These compounds are made from the known 3β-hydroxy-5,16-pregnadien-20-one (16-dehydro-pregnenolone) or from the 3-esters thereof by esterification and enol esterification. If it is desired to have identical acyloxy groups in the 3- and 20-positions, the esterification and enol esterification may be performed in one step, for example, by heating at reflux or slowly distilling a mixture of 16-dehydropregnenolone with an acid anhydride such as acetic, propionic, butyric, valeric, anhydride and the like, or with an isopropenyl ester, such as isopropenyl acetate, propionate, butyrate, valerate, isovalerate, hexanoate, heptanoate, octanoate, benzoate, β-cyclopentylpropionate, phenylacetate, toluate, salicylate, anisate, and the like, in the presence of an acid catalyst, preferably para-toluenesulfonic acid monohydrate, and isolating the thus-prepared 3β,20-diacyloxy-5,16,20-pregnatriene as shown in Preparations 1 and 2. Another method of preparing 3β,20-diacyloxy-5,16,20-pregnatriene consists in enol-acylation of 16-dehydropregnenolone esters as illustrated by the method of Moffett et al., J. Am. Chem. Soc. 74, 2183 (1952), for the preparation of 3β,20-diacetoxy-5,16,20-pregnatriene. By using a specific 16-dehydropregnenolone ester, prepared by standard methods of esterification, and subsequent enol-acylation, 3β,20-diacyloxy-5,16,20-pregnatrienes with unlike acyloxy groups can be prepared (cf. Preparations 3 thru 6). The esters of 16-dehydropregnenolone are obtained by admixing 16-dehydropregnenolone with an acylating agent such as, for example, ketene, an acid, an acid chloride or bromide, an acid anhydride or other known acylating agent usually in a solvent such as, for example, pyridine, or the like, or an inert solvent, including illustratively benzene, toluene, ether and the like, and heating at a temperature between about zero degrees centigrade and the boiling point of the reaction mixture, usually about room temperature, for a period between about a half hour and about 96 hours. The time of reaction as well as the temperature at which the reaction is carried out, the acylating agent, and the ratio of reactants can be varied. The ester is recovered from the reaction mixture by pouring into ice or cold water, collecting in an appropriate solvent, and washing with successive portions of a mildly basic solution and water to obtain a solution of the product which is essentially neutral. In some instances, the ester crystallizes from the reaction mixture, in which case it is advantageously separated by filtration or other means, washed with water, and thereafter purified by conventional means, such as by recrystallization from a suitable solvent or by chromatographic purification, as deemed necessary.

In carrying out the process of the present invention the selected 3β,20-diacyloxy-5,16,20-pregnatriene, either as a solid or dissolved in an organic solvent, is admixed with the solution of an epoxidizing agent in an organic solvent. Suitable solvents for either the starting compound or the epoxidizing agents are benzene, chloroform, toluene, chlorobenzene, carbon tetrachloride, methylene dichloride, hexane mixtures like Skellysolve B, and the like, with benzene and chloroform preferred. The epoxidizing agents utilized are usually perbenzoic acid, peracetic acid, performic acid, monoperphthalic acid and other available organic peracids. The preferred temperature range for the epoxidation reaction is between zero and thirty degrees centigrade, but a temperature range of minus ten and plus forty degrees centigrade is operative. The time of reaction may vary between a quarter of an hour and 24 hours or even longer. The course of reaction, however, can be followed by iodometric titration of aliquot samples withdrawn from the reaction mixture at regular time intervals. After two moles of peracids are consumed, the reaction can be quenched by adding water or crushed ice. The product, a 3β,20-diacyloxy-5α(6α),16α(17α)-diepoxy-20-pregnene is obtained from the organic layer by standard procedures, such as solvent extraction, evaporation of the organic solvent and recrystallization from organic solvents such as methanol, ethanol, ethyl acetate and Skellysolve B hexanes, mixtures of these, and the like.

The thus-obtained 3β,20-diacyloxy-5α(6α),16α(17α)-diepoxy-20-pregnene is then hydrolyzed. The hydrolysis may be carried out under various conditions, preferably by dissolving the compound in any suitable organic solvent, such as methanol, ethanol, propanol, tertiary butyl alcohol, acetone, dioxane, or the like, to which is added a solution of an alkali hydroxide, such as sodium or potassium hydroxide or other like basic reagents such as sodamide, calcium hydroxide, barium hydroxide, sodium carbonate, or the like, with sodium or potassium hydroxide preferred. The temperature of reaction is preferably between zero and thirty degrees centigrade, but higher temperatures, up to the boiling point of the solvent selected, are operative. Temperatures below zero are also operative but increase the reaction time unnecessarily. The reaction time under the preferred conditions of temperature is between one quarter of an hour and twelve hours. After completion of the hydrolysis, the solution is usually diluted with water and the thus-obtained 3β-hydroxy-5α(6α),16α(17α)-diepoxypregnan-20-one is isolated from the reaction mixture by conventional means such as extraction with water-insoluble organic solvents, for example, ether, methylene dichloride, chloroform, carbontetrachloride, benzene and the like, and evaporating the organic solvent. The residue thus-obtained is purified preferably by recrystallization from alcohols, acetone, ethyl acetate, Skellysolve B (hexane mixture) and other like solvents to yield pure 3β-hydroxy-5α(6α),16α(17α)-diepoxypregnan-20-one.

In order to obtain a 3β-acyloxy-5α(6α),16α(17α)-diepoxypregnan-20-one, 3β-hydroxy-5α(6α),16α(17α)-diepoxypregnan-20-one is esterified by conventional acylating methods, such as admixing the 3β-hydroxy-5α(6α),-16α(17α)-diepoxypregnan-20-one with an acylating agent, for example, ketene, an acid chloride or bromide, or an acid anhydride or an isopropenyl acylate or other known acylating agents, usually in a solvent such as, for example, pyridine or the like, or an inert solvent, including solvents like benzene, toluene, ether and the like, and heating at a temperature between about zero degrees centigrate and the boiling point of the reaction mixture, usually about room temperature, for a period between about a half hour and about 96 hours. The time of reaction as well as the temperature at which the reaction is carried out, the acylating agent, and the ratio of reactants can be varied. The ester is recovered from the reaction mixture by pouring into ice or cold water, collecting in an appropriate solvent, and washing with successive portions of a mildly basic solution and water to obtain a solution of the product which is essentially neutral. In some instances, the ester crystallizes from the reaction mixture, in which case it is advantageously separated by filtration or other means, washed with water, and thereafter purified by conventional means, such as by recrystallization from a suitable solvent or by chromatographic purification, as deemed necessary.

The following examples are illustrative of the process and products of the present invention, but are not to be construed as limiting.

PREPARATION 1.—3β,20-DIACETOXY-5,16,20-PREGNATRIENE

One gram of 3β-hydroxy-5,16-pregnadien-20-one (16-dehydropregnenolone), 100 milligrams of para-toluenesulfonic acid monohydrate, five milliliters of acetic anhydride and five milliliters of benzene were heated under reflux at atmospheric pressure for eight hours. The excess of acetic anhydride, the acetic acid, and the benzene were then removed by distillation under reduced pressure and the reaction mixture was taken up in 100 milliliters of ether. The ether solution was washed three times with twenty-milliliter portions of five percent sodium carbonate solution and subsequently with water until neutral. The ether was then removed under reduced pressure and the residue was recrystallized from acetone to give 3β,20-diacetoxy-5,16,20-pregnatriene of melting point 148 to 149 degrees centigrade.

PREPARATION 2.—3β,20-DIPROPIONYLOXY-5,16,20-PREGNATRIENE

A solution of one gram of 3β-hydroxy-5,16-pregnadien-20-one in 25 milliliters of isopropenyl propionate and 150 milligrams of para-toluenesulfonic acid monohydrate were slowly distilled for a period of twelve hours. From time to time isopropenyl propionate was added to keep the volume of the solution above ten milliliters. After the mixture had cooled, one gram of sodium bicarbonate was added and the remaining isopropenyl propionate was removed by distillation under reduced pressure. The residue was shaken with ether and ice water, the water layer was extracted with more ether and the combined ether layer was washed with saturated sodium chloride solution, water, and dried over anhydrous sodium sulfate. The ether was removed under reduced pressure and the residue was recrystallized from acetone to give 3β,20-dipropionyloxy-5,16,20-pregnatriene.

In a manner similar to Preparations 1 and 2, by treating 16-dehydropregnenolone with other hydrocarbon carboxylic acid anhydrides or with a selected isopropenyl ester, the following representative esters may be made: 3β,20 - dibutyryloxy - 5,16,20-pregnatriene, 3β,20-divaleryloxy - 5,16,20-pregnatriene, 3β,20-diisovaleryloxy-5,16,20 - pregnatriene, 3β,20-dihexanoyloxy-5,16,20-pregnatriene, 3β,20 - diheptanoyloxy - 5,16,20-pregnatriene, 3β,20-dioctanoyloxy-5,16,20-pregnatriene, 3β,20-dibenzoyloxy - 5,16,20 - pregnatriene, 3β,20-di-β-cyclopentylpropionyloxy - 5,16,20-pregnatriene, 3β,20-diphenylacetoxy-5,16,20 - pregnatriene, 3β,20-ditoluyloxy-5,16,20-pregnatriene, 3β,20 - dianisoyloxy-5,16,20-pregnatriene, 3β,20-disalicyloyloxy - 5,16,20-pregnatriene, 3β,20-digallyloxy-5,16,20 - pregnatriene, 3β,20-dimaleyloxy-5,16,20-pregnatriene, 3β,20 - dihemisuccinyloxy - 5,16,20-pregnatriene, 3β,20 - dihydrogencitryloxy-5,16,20-pregnatriene, and the like.

PREPARATION 3.—3β-BENZOYLOXY-5,16-PREGNADIEN-20-ONE

One gram of 3β-hydroxy-5,16-pregnadien-20-one, dissolved in ten milliliters of pyridine, was allowed to stand with one milliliter of benzoyl choride at room temperature (about 22 to 25 degrees centigrade) for a period of two hours. Thereafter the mixture was poured into thirty milliliters of water. The precipitate thus-formed was allowed to settle, the supernatant liquid was decanted and the residue was washed with five percent sodium carbonate solution and water and recrystallized from methyl alcohol to yield 3β-benzoyloxy-5,16-pregnadien-20-one.

PREPARATION 4.—3β-BENZOYLOXY-20-ACETOXY-5,16,20-PREGNATRIENE

A solution of one gram of 3β-benzoyloxy-5,16-pregnadien-20-one (Preparation 2) and 0.15 gram of para-toluenesulfonic acid monohydrate in about twenty milliliters of isopropenyl acetate was slowly distilled for a period of about ten hours through a short fractionating column. From time to time isopropenyl acetate was added to keep the volume of the solution above ten milliliters. After cooling the solution remaining in the flask, one gram of sodium bicarbonate was added and the remaining isopropenyl acetate was removed by distillation under reduced pressure at a temperature below thirty degrees centigrade. The residue was shaken with ether and ice water, the water layer was extracted with more ether and the combined ether layer was washed with saturated sodium chloride solution, water, and dried over anhydrous sodium sulfate. The ether was removed under reduced pressure and the residue was recrystallized from methyl alcohol to yield 3β-benzoyloxy-20-acetoxy-5,16,20-pregnatriene.

PREPARATION 5.—3β-VALERYLOXY-5,16-PREGNADIEN-20-ONE

Following the procedure given in Preparation 3, 3β-valeryloxy-5,16-pregnadien-20-one is prepared by reacting valeryl chloride with 16-dehydropregnenolone at room temperature to produce 3β-valeryloxy-5,16-pregnadien-20-one.

PREPARATION 6.—3β-VALERYLOXY-20-ACETOXY-5,16,20-PREGNATRIENE

Following the procedure given in Preparation 4, 3β-valeryloxy-20-acetoxy-5,16,20-pregnatriene is produced by heating 3β-valeryloxy-5,16-pregnadien-20-one with isopropenyl acetate to yield 3β - valeryloxy - 20 - acetoxy-5,16,20-pregnatriene.

In the manner shown by Preparations 3 through 6, other representative starting compounds can be prepared such as: 3β - phenylacetoxy - 20-acetoxy-5,16,20-pregnatriene, 3β - toluyloxy-20-acetoxy-5,16,20-pregnatriene, 3β-anisoyloxy-20-acetoxy-5,16,20-pregnatriene, 3β-salicyloyloxy - 20-acetoxy-5,16,20-pregnatriene, 3β-propionloxy-20-acetoxy - 5,16,20-pregnatriene, 3β-butyryloxy-20-acetoxy-5,16,20-pregnatriene, 3β-isovaleryloxy-20-acetoxy-5,16,20-pregnatriene, 3β-hexanoyloxy-20-acetoxy-5,16,20-pregnatriene, 3β - heptanoyloxy-20-acetoxy-5,16,20-pregnatriene, 3β-octanoyloxy-20-acetoxy-5,16,20-pregnatriene, 3β-(β-cyclopentylpropionyloxy) - 20-acetoxy-5,16,20-pregnatriene, 3β-gallyloxy-20-acetoxy-5,16,20-pregnatriene, 3β-maleyloxy-20-acetoxy-5,16,20-pregnatriene, 3β-dihydrogencitryloxy-20-acetoxy-5,16,20-pregnatriene, 3β-hemisuccinyloxy-20 - acetoxy-5,16,20-pregnatriene, 3β-hemitartaryloxy-20-acetoxy - 5,16,20-pregnatriene, 3β-acetoxy-20-propionloxy-5,16,20 - pregnatriene, 3β - acetoxy-20-butyryloxy-5,16,20-pregnatriene, 3β - acetoxy - 20-valeryloxy-5,16,20-pregnatriene, 3β - acetoxy-20-isovaleryloxy-5,16,20-pregnatriene, 3β - acetoxy - 20-hexanoyloxy-5,16,20-pregnatriene, 3β-acetoxy - 20 - heptanoyloxy-5,16,20-pregnatriene, 3β-acetoxy - 20-octanoyloxy-5,16,20-pregnatriene, 3β-acetoxy-20-benzoyloxy - 5,16,20-pregnatriene, 3β-acetoxy-20-phenylacetoxy - 5,16,20-pregnatriene, 3β-acetoxy-20-toluyloxy-5,16,20 - pregnatriene, 3β-acetoxy-20-anisoyloxy-5,16,20-pregnatriene, 3β-acetoxy-20-salicyloyloxy-5,16,20-pregnatriene, 3β - acetoxy - 20 - (β-cyclopentylpropionyloxy)-5,16,20 - pregnatriene, 3β-acetoxy-20-gallyloxy-5,16,20-pregnatriene, 3β - acetoxy - 20-maleyloxy-5,16,20-pregnatriene, 3β-acetoxy-20-dihydrogencitryloxy-5,16,20-pregnatriene, 3β - acetoxy - 20-hemisuccinyloxy-5,16,20-pregnatriene, 3β - acetoxy - 20-hemitartaryloxy-5,16,20-pregnatriene; and the like.

Example 1.—3β,20 - diacetoxy-5α(6α),16α(17α)-diepoxy-20-pregnene

A solution containing 0.57 gram (4.12 millimole) of perbenzoic acid in fifteen milliliters of benzene was added to 0.50 gram (1.26 millimoles) of 3β,20-diacetoxy-5,16,20-pregnatriene. The resulting solution was allowed to stand in the dark for thirty minutes after which period 2.07 molar equivalents of perbenzoic acid had been consumed as determined by titration of an aliquot sample. Titration of a second aliquot sample fifteen minutes later showed no change in peracid concentration. To the reaction mixture was now added ether and cracked ice. The ether phase was separated, washed with cold five percent sodium hydroxide solution and subsequently with water until the wash-water was neutral. The ether solution was then dried over anhydrous sodium sulfate and evaporated at reduced pressure (the ether was distilled below thirty degrees centigrade) to yield a glassy residue. This residue was twice recrystallized to give 3β,20-diacetoxy-5α(6α),16α(17α)-diepoxy-20-pregnene of melting point 162 to 163 degrees centigrade.

Analysis:
Calculated for $C_{25}H_{34}O_6$ _____ C, 69.74; H, 7.96
Found _____ C, 69.72; H, 8.02

Example 2.—3β,20 - diacetoxy-5α(6α),16α(17α)-diepoxy-20-pregnene

A solution of 3.98 grams of 3β,20-diacetoxy-5,16,20-pregnatriene, dissolved in 95 milliliters of chloroform and cooled to five degrees centigrade was admixed with a slurry made of 0.1234 gram of anhydrous sodium acetate and 5.7 milliliters of forty percent peracetic acid. The resulting solution was stored in a refrigerator at five degrees centigrade, and small aliquot samples were removed at regular time intervals for titration. After six hours two molar equivalents of peracetic acid had been consumed. No further change was noted after eighteen additional hours, hence the colorless solution was diluted with chloroform, washed with water, five percent sodium hydroxide solution and then with water until the washwaters were neutral. The chloroform solution was then dried over anhydrous sodium sulfate and evaporated to dryness yielding 3.73 grams of fine needles of 3β,20-diacetoxy-5α(6α),16α(17α)-diepoxy-20-pregnene. After two recrystallizations from methanol the melting point of the thus - obtained 3β,20-diacetoxy-5α(6α),16α(17α)-diepoxy-20-pregnene was found to be 166 to 167 degrees centigrade, $[\alpha]_D$ —25 degrees in chloroform.

Analysis:
Calculated for $C_{25}H_{34}O_6$_____ C, 69.74; H, 7.96
Found _____ C, 69.79; H, 8.03

Example 3.—3β-hydroxy-5α(6α),16α(17α)-diepoxypregnan-20-one

A solution of one half gram (0.5 gram) of 3β,20-diacetoxy - 5α(6α),16α(17α) - diepoxy - 20 - pregnene in twenty milliliters of a five percent sodium hydroxide solution in methanol was allowed to stand at room temperature (about 22 to 25 degrees centigrade) for a period of thirty minutes. The reaction mixture was then diluted with water and extracted four times with chloroform. The combined organic extracts were washed with water until neutral and dried over anhydrous sodium sulfate. Evaporation of this chloroform solution gave crude 3β - hydroxy - 5α(6α),16α(17α)-diepoxypregnan-20-one, which, when crystallized from methanol, yielded needles of melting point 183 to 190 degrees centigrade.

The same compound could also be prepared by the stepwise epoxidation of 3β-acetoxy-5,16-pregnadien-20-one. 3β-acetoxy-5,16-pregnadien-20-one, dissolved in chloroform, yielded, with perbenzoic acid, 3β-acetoxy-5α(6α)-epoxy-16-pregnen-20-one of melting point 196 to 197.5 degrees centigrade, and $[\alpha]_D=+37$ degrees in chloroform.

Analysis:
Calculated for $C_{23}H_{32}O_4$_____ C, 74.16; H, 8.66
Found _____ C, 74.54; H, 8.72
C, 74.49; H, 8.44

Treatment of 3β-acetoxy-5α(6α)-epoxy-16-pregnen-20-one with hydrogen peroxide in a solution of methanol and sodium hydroxide gave 3β-hydroxy-5α(6α),16α-(17α)-diepoxypregnan-20-one of melting point 199 to 207 degrees centigrade.

Analysis:

Calculated for $C_{21}H_{30}O_4$ _____ C, 72.80; H, 8.73
Found _____ C, 72.61; H, 8.78

Treatment of 3β-acetoxy-5α(6α)-epoxy-16-pregnene-20-one with an aqueous acetone solution of sulfuric acid produced at room temperature 3β-acetoxy-5α,6β-dihydroxy-16-pregnen-20-one of melting point 245 to 253 degrees centigrade which could be converted back to 3β-acetoxy-5α(6α)epoxy-16-pregnen-20-one with methanesulfonyl chloride in pyridine.

*Example 4.—3β-acetoxy-5α(6α),16α(17α)-diepoxypregnan-20-one*

A solution of 0.2 gram of 3β-hydroxy-5α(6α),-16α(17α)-diepoxypregnan-20-one, 0.2 milliliter of acetic anhydride and two milliliters of pyridine were allowed to stand at room temperature (about 22 to 25 degrees centigrade) for a period of two hours. The mixture thereafter was poured into 25 milliliters of water and the thus-obtained precipitate was collected on a filter. Recrystallization of the precipitate from methanol yielded crystalline 3β-acetoxy-5α(6α),16α(17α)-diepoxypregnan-20-one of melting point 207 to 208 degrees centigrade.

*Example 5.—3β,20-dipropionyloxy-5α(6α),16α(17α)-diepoxy-20-pregnene*

In the manner given in Example 1, 3β,20-dipropionyloxy-5,16,20-pregnatriene is admixed with a solution of perbenzoic acid in benzene to yield 3β,20-dipropionyloxy-5α(6α),16α(17α)-dioxido-20-pregnene.

*Example 6.—3β-hydroxy-5α(6α),16α(17α)-diepoxypregnan-20-one*

In the manner given in Example 3, 3β,20-dipropionyloxy-5α(6α),16α(17α)-diepoxy-20-pregnene is admixed with a methanolic solution of sodium hydroxide to yield 3β-hydroxy-5α(6α),16α(17α)-diepoxypregnan-20-one.

*Example 7.—3β-propionyloxy-5α(6α),16α(17α)-diepoxypregnan-20-one*

In the manner given in Example 4, acylation of 3β-hydroxy-5α(6α),16α(17α)-diepoxypregnan-20-one with propionic anhydride yields 3β-propionyloxy-5α(6α),-16α(17α)-diepoxypregnan-20-one.

*Example 8.—3β-benzoyloxy-20-acetoxy-5α(6α),16α(17α)-diepoxy-20-pregnene*

In the manner given in Example 1, 3β-benzoyloxy-20-acetoxy-5,16,20-pregnatriene is admixed with a solution of perbenzoic acid in benzene to yield 3β-benzoyloxy-20-acetoxy-5α(6α),16α(17α)-diepoxy-20-pregnene.

*Example 9.—3β-hydroxy-5α(6α),16α(17α)-diepoxypregnan-20-one*

In the manner given in Example 3, 3β-benzoyloxy-20-acetoxy-5α(6α),16α(17α)-diepoxy-20-pregnene is admixed with a methanolic solution of sodium hydroxide to yield 3β-hydroxy-5α(6α),16α(17α)-diepoxypregnan-20-one.

*Example 10.—3β-benzoyloxy-5α(6α),16α(17α)-diepoxypregnan-20-one*

In the manner given in Example 4, acylation of 3β-hydroxy-5α(6α),16α(17α)-diepoxypregnan-20-one with benzoyl chloride in pyridine yields 3β-benzoyloxy-5α(6α),16α(17α)-diepoxypregnan-20-one.

*Example 11.—3β-acetoxy-20-(β-cyclopentylpropionyloxy-5α(6α),16α(17α)-diepoxypregnan-20-pregnene*

In the manner given in Example 2, 3β-acetoxy-20-(β-cyclopentylpropionyloxy-5,16,20-pregnatriene is admixed with a solution of perbenzoic acid in benzene to yield 3β - acetoxy - 20 - (β-cyclopentylpropionyloxy)-5α(6α), 16α(17α)-diepoxy-20-pregnene.

*Example 12.—3β - hydroxy - 5α(6α),16α(17α)-diepoxypregnan-20-one*

In the manner given in Example 3, 3β-acetoxy-20-(β-cyclopentylpropionyloxy) - 5α(6α),16α(17α)-diexopy-20-pregnene is admixed with a methanolic solution of sodium hydroxide to yield 3β-hydroxy-5α(6α),16α(17α)-diepoxypregnan-20-one.

*Example 13.—3β - (β-cyclopentylpropionyloxy)-5α(6α), 16α(17α)-diepoxypregnan-20-one*

In the manner given in Example 4, acylation of 3β-hydroxy-5α(6α),16α(17α)-diepoxypregnan-20 - one with β-cyclopentylpropionyl chloride yields 3β-(β-cyclopentylpropionyloxy)-5α(6α),16α(17α)-diepoxypregnan-20-one.

In a manner similar to Examples 1, 2, 5, 8, and 11 by treating a selected 3β,20-diacyloxy-5,16,20-pregnatriene with a peracid such as performic, peracetic, perbenzoic, monoperphthalic acid, and the like, other representative 3β,20 - diacyloxy - 5α(6α),16α(17α) - diepoxy - 20-pregnenes are prepared such as: 3β,20-divaleryloxy-5α(6α),16α(17α) - diepoxy - 20 - pregnene, 3β,20 - dihexanoyloxy - 5α(6α),16α(17α) - diepoxy - 20 - pregnene, 3β,20 - diheptanoyloxy - 5α(6α),16α(17α) - diepoxy - 20-pregnene, 3β,20 - dioctanoyloxy - 5α(6α),16α(17α) - diepoxy - 20 - pregnene, 3β,20 - di - (β - cyclopentylpropionyloxy) - 5α(6α),16α(17α) - diepoxy - 20 - pregnene, 3β,20 - dibenzoyloxy-5α(6α),16α(17α) - diepoxy - 20-pregnene, 3β,20 - dianisoyloxy - 5α(6α),16α(17α) - diepoxy - 20 - pregnene, 3β,20 - disalicyloyloxy - 5α(6α), 16α(17α) diepoxy - 20 - pregnene, 3β,20 - diphenylacetoxy-5α(6α),16α(17α)-diepoxy-20-pregnene; 3β-acetoxy-20 - propionyloxy - 5α(6α),16α(17α) - diepoxy - 20 - pregnene, 3β - acetoxy - 20 - butyryloxy - 5α(6α),16α(17α)-diepoxy-20-pregnene, 3β-acetoxy-20-valeryloxy-5α(6α), 16α(17α)-diepoxy-20-pregnene, 3β-acetoxy-20-isovaleryloxy - 5α(6α),16α(17α) - diepoxy - 20 - pregnene, 3β-acetoxy - 20 - hexanoyloxy - 5α(6α),16α(17α) - diepoxy-20 - pregnene, 3β - acetoxy - 20 - heptanoyloxy - 5α(6α), 16α(17α)-diepoxy-20-pregnene, 3β-acetoxy-20-octanoyloxy-5α(6α),16α(17α)-diepoxy-20-pregnene, 3β-acetoxy-20 - benzoyloxy - 5α(6α),16α(17α) - diepoxy - 20 - pregnene, 3β-acetoxy-20-phenylacetoxy-5α(6α),16α(17α)-diepoxy - 20 - pregnene, 3β - acetoxy - 20 - toluyloxy-5α(6α),16α(17α) - diepoxy - 20 - pregnene, 3β - acetoxy-20-anisoyloxy-5α(6α),16α(17α)-diepoxy-20-pregnene, 3β-acetoxy - 20 - salicyloyloxy - 5α(6α),16α(17α) - diepoxy-20-pregnene, 3β-acetoxy-20-gallyloxy-5α(6α),16α(17α)-diepoxy - 20 - pregnene, 3β - acetoxy - 20 - maleyloxy-5α(6α),16α(17α)-diepoxy-20-pregnene, 3β-acetoxy-20-dihydrogencityloxy - 5α(6α),16α(17α) - diepoxy - 20-pregnene, 3β - acetoxy - 20 - hemisuccinyloxy - 5α(6α), 16α(17α)-diepoxy-20-pregnene, 3β-acetoxy-20-hemitartaryloxy-5α(6α),16α(17α)-diepoxy-20-pregnene; 3β-phenylacetoxy - 20 - acetoxy - 5α(6α),16α(17α) - diepoxy-20-pregnene, 3β-toluyloxy-20-acetoxy-5α(6α),16α(17α)-diepoxy - 20 - pregnene, 3β - anisolyoxy - 20 - acetoxy-5α(6α),16α(17α)-diepoxy-20-pregnene, 3β-propionyloxy-20 - acetoxy - 5α(6α),16α(17α) - diepoxy - 20 - pregnene, 3β - butyryloxy - 20 - acetoxy - 5α(6α),16α(17α) - diepoxy-20-pregnene, 3β-isovaleryloxy-20-acetoxy-5α(6α), 16α(17α) - diepoxy - 20 - pregnene, 3β - hexanoyloxy-20 - acetoxy - 5α(6α),16α(17α) - diepoxy - 20 - pregnene, 3β - heptanoyloxy - 20 - acetoxy - 5α(6α),16α(17α) - diepoxy-20-pregnene, 3β-octanoyloxy-20-acetoxy-5α(6α), 16α(17α) - diepoxy - 20 - pregnene, 3β - (β - cyclopentylpropionyloxy) - 20 - acetoxy - 5α(6α),16α(17α) - diepoxy-20-pregnene, 3β-gallyloxy-20-acetoxy-5α(6α),16α(17α)-diepoxy - 20 - pregnene, 3β - maleyloxy - 20 - acetoxy-5α(6α),16α(17α)-diepoxy-20-pregnene, 3β-dihydrogencityloxy - 20 - acetoxy - 5α(6α),16α(17α) - diepoxy - 20-pregnene, 3β - hemisuccinyloxy - 20 - acetoxy - 5α(6α), 16α(17α) - diepoxy - 20 - pregnene, 3β - hemitartaryloxy-20 - acetoxy - 5α(6α),16α(17α) - diepoxy- 20 - pregnene; and the like.

In a manner similar to Examples 3, 6, 9 and 12, these

3β,20 - diacyloxy - 5α(6α),16α(17α) - diepoxy - 20 - pregnenes can be hydrolyzed to give 3β - hydroxy - 5α(6α), 16α(17α)-diepoxypregnan-20-one which can be acylated as shown in Examples 4, 7, 10 and 13 to give the corresponding 3β-acyloxy-5α(6α),16α(17α)-diepoxypregnan-20-ones. Representative 3β-acyloxy-5α(6α),16α(17α)-diepoxypregnan-20-ones thus-obtained comprise: 3β-butyryloxy - 5α(6α),16α(17α) - diepoxypregnan - 20 - one, 3β - valeryloxy - 5α(6α),16α(17α) - diepoxypregnan-20-one, 3β-isovaleryloxy-5α(6α),16α(17α)-diepoxypregnan-20 - one, 3β - hexanoyloxy - 5α(6α),16α(17α) - diepoxypregnan - 20 - one, 3β - heptanoyloxy - 5α(6α),16α(17α)- diepoxypregnan - 20 - one, 3β - octanoyloxy - 5α(6α), 16α(17α)-diepoxypregnan - 20 - one, 3β - phenylacetoxy-5α(6α),16α(17α)-diepoxypregnan-20-one, 3β-anisoyloxy-5α(6α),16α(17α)-diepoxypregnan-20-one, 3β-salicyolyloxy - 5α(6α),16α(17α) - diepoxypregnan - 20 - one, 3β-toluyloxy - 5α(6α),16α(17α) - diepoxypregnan - 20 - one, 3β - gallyloxy - 5α(6α),16α(17α) - diepoxypregnan - 20-one, 3β-dihydrogencitryloxy-5α(6α),16α(17α)-diepoxypregnan - 20 - one, 3β-hemisuccinyloxy-5α(6α),16α(17α)-diepoxypregnan - 20 - one, 3β - hemitartaryloxy - 5α(6α), 16α(17α)-diepoxypregnan-20-one, 3β-maleyloxy-5α(6α), 16α(17α)-diepoxypregnan-20-one, 3β-trimethylacetoxy-5α(6α),16α(17α)-diepoxypregnan-20-one; and the like.

It is to be understood that this invention is not to be limited to the exact details of operation or exact compounds shown and described as obvious modifications and equivalents will be apparent to one skilled in the art and the invention is therefore to be limited only by the scope of the appended claims.

I claim:

1. In a process for the production of a 3-oxygenated-5α(6α),16α(17α)-diepoxypregnan-20-one compound of the formula:

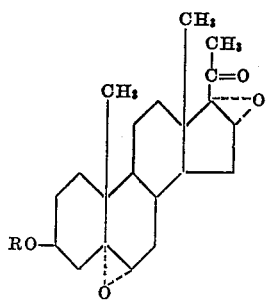

wherein R is selected from the group consisting of hydrogen and acyl radicals of carboxylic acids containing up to and including eight carbon atoms, the steps which comprise: mixing a 3β,20-diacyloxy-5,16,20-pregnatriene of the formula:

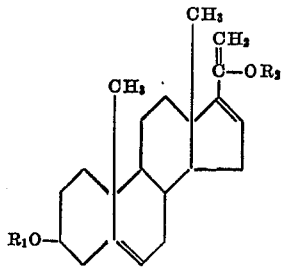

wherein $R_1$ and $R_2$ are acyl radicals of carboxylic acids containing up to and including eight carbon atoms, with an organic peracid at a temperature between minus ten and plus forty degrees centigrade to give a 3β,20-diacyloxy-5α(6α),16α(17α)-diepoxy-20-pregnene and hydrolyzing the thus-obtained diepoxy-20-pregnene with a basic reagent to obtain 3β-hydroxy-5α(6α),16α(17α)-diepoxypregnan-20-one.

2. A process for the production of 3β-hydroxy-5α(6α),16α(17α)-diepoxypregnan-20-one which comprises: mixing a 3β,20-diacyloxy-5,16,20-pregnatriene wherein the acyl radicals are of carboxylic acids containing up to and including eight carbon atoms with an organic peracid selected from the group consisting of performic, peracetic, perbenzoic and monoperphthalic acid at a temperature between zero and thirty degrees centigrade to give 3β,20-diacyloxy-5α(6α),16α(17α)-diepoxy-20-pregnene and hydrolyzing the thus-produced diepoxy-20-pregnene with an alkali hydroxide to obtain 3β-hydroxy-5α(6α),16α(17α)-diepoxypregnan-20-one.

3. The process of claim 2 wherein the 3β,20-diacyloxy-5,16,20-pregnatriene is 3β,20-diacetoxy-5,16,20-pregnatriene.

4. A process for the production of a 3β-acyloxy-5α(6α),16α(17α)-diepoxypregnan-20-one wherein the acyl radical is of an organic carboxylic acid containing up to and including eight carbon atoms, which comprises: mixing a 3β,20-diacyloxy-5,16,20-pregnatriene wherein the acyl radicals are defined as above with an organic peracid at a temperature between minus ten and plus forty degrees centigrade to give a 3β,20-diacyloxy-5α(6α),16α(17α)-diepoxy-20-pregnene, hydrolyzing the thus-obtained diepoxy-20-pregnene with a basic reagent to obtain 3β-hydroxy-5α(6α),16α(17α)-diepoxypregnan-20-one, and treating the thus-obtained 3β-hydroxy-5α(6α),16α(17α)-diepoxypregnan-20-one with an acylating agent selected from ketene, isopropenyl acylate, acid anhydride, acid chloride and acid bromide, to obtain a 3β-acyloxy-5α(6α),16α(17α)-diepoxypregnan-20-one defined as above.

5. A process for the production of 3β-acetoxy-5α(6α),16α(17α)-diepoxypregnan-20-one which comprises: mixing a 3β,20-diacyloxy-5,16,20-pregnatriene wherein the acyl radicals are of carboxylic acids containing up to and including eight carbon atoms with an organic peracid selected from the group consisting of performic, peracetic, perbenzoic and monoperphthalic acid at a temperature between zero and thirty degrees centigrade to give 3β,20-diacyloxy-5α(6α),16α(17α)-diepoxy-20-pregnene, hydrolyzing the thus-produced diepoxy-20-pregnene with an alkali hydroxide to obtain 3β-hydroxy-5α(6α),16α(17α)-diepoxypregnan-20-one, and treating the thus-produced 3β-hydroxy-5α(6α),16α(17α)-diepoxypregnan-20-one with acetic anhydride in pyridine to obtain 3β-acetoxy-5α(6α),16α(17α)-diepoxypregnan-20-one.

6. The process of claim 5 wherein the starting 3β,20-diacyloxy-5,16,20-pregnatriene is 3β,20-diacetoxy-5,16,20-pregnatriene.

References Cited in the file of this patent
UNITED STATES PATENTS

| | | |
|---|---|---|
| 2,312,344 | Logeman | Mar. 2, 1943 |
| 2,323,277 | Miescher | June 29, 1943 |
| 2,602,769 | Murray | July 8, 1952 |
| 2,686,181 | Julian | Aug. 10, 1954 |

OTHER REFERENCES

Moffet: J. Am. Chem. Soc., pp. 2183–85 (1952).